March 11, 1969     W. A. JONES     3,432,095
LAND MEASURER
Filed Sept. 11, 1967
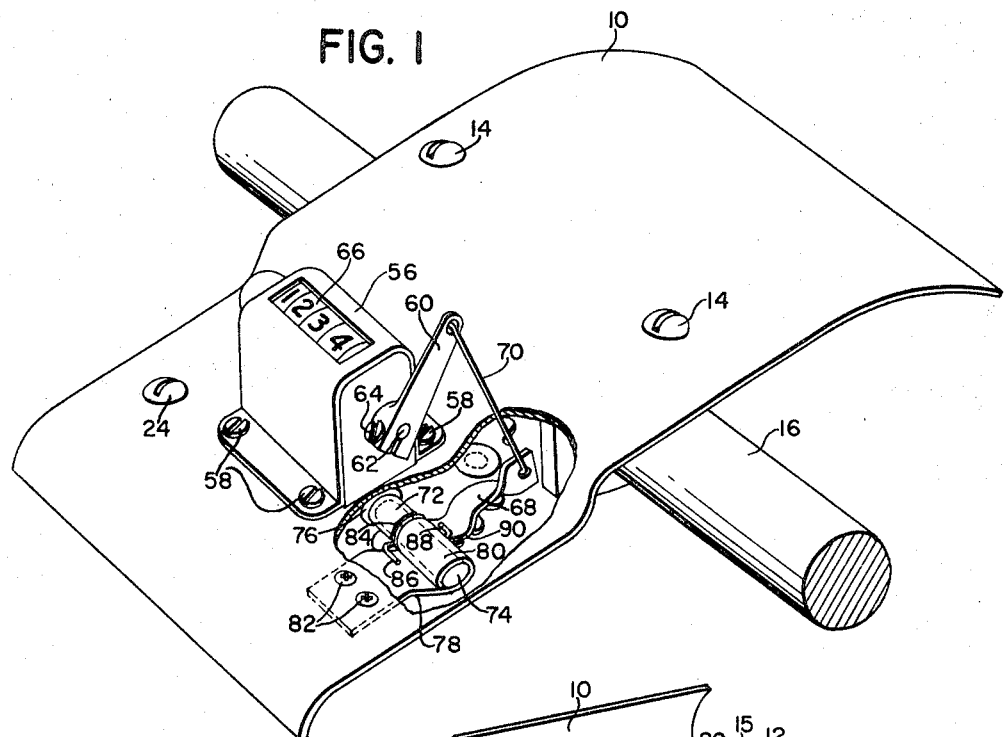
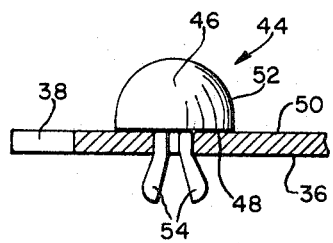
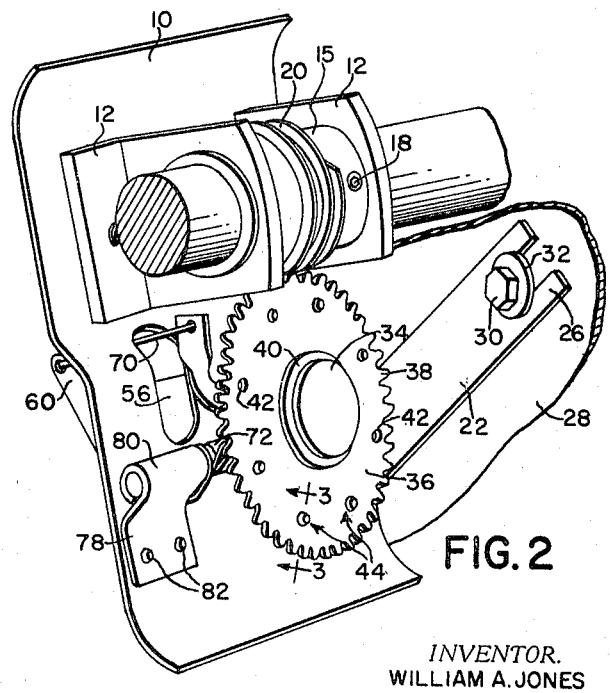
INVENTOR.
WILLIAM A. JONES
BY
*John C. Thompson*
ATTORNEY

United States Patent Office 3,432,095
Patented Mar. 11, 1969

3,432,095
LAND MEASURER
William A. Jones, Fonthill, Ontario, Canada, assignor to Deere & Company, Moline, Ill., a corporation of Delaware
Filed Sept. 11, 1967, Ser. No. 666,883
U.S. Cl. 235—91
Int. Cl. G06m 1/22
8 Claims

ABSTRACT OF THE DISCLOSURE

A land measurer for use with agricultural implements which may be of different incremental widths, the measurer having removable cams that actuate a counter, varying numbers of cams being employed for machines of varying widths.

Field of the invention

The present invention relates generally to agricultural implements, and more particularly to a land measurer for agricultural implements employed for distributing material (such as seeds and fertilizers) to the surface of the ground, the machines being manufactured in widths of various increments.

Description of the prior art

Various agricultural implements such as disk tillers with fertilizer attachments, grain drills, and the like are manufactured in varying widths. Thus, it is common practice to manufacture disk tillers in widths of 12, 16, 20, 24 and 28 feet. It is also common practice to employ land measuring devices with these machines to determine the number of acres covered by the machines. Since these machines may be of different widths, it is necessary to provide either a land measurer for each specific width, or a land measurer having a variable input drive which is changeable for each machine width.

One form of land measuring device of this class is shown in U.S. Pat. No. 2,883,833 issued June 2, 1959, to S. L. Toderick. In this form, a rotary counter is driven by a gear having deformable teeth. While this form of device has been generally satisfactory, it does have a disadvantage in that the deformable teeth are also easily broken which may cause incorrect readings once the counter is placed in operation.

In recent years, a new form of counter having a reciprocating input has replaced the counter of Toderick which has a rotary input. A form of this counter is shown in the U.S. Pat. No. 3,140,046, issued July 7, 1964 to Borngraeber. In this form, a replaceable gear drives a trip mechanism which actuates a counter. As machine widths vary, it is generally desirable to replace the gear mechanism, but there is provision to dispose the trip mechanism in one of three positions so that the counter may be tripped once, twice or three times during each revolution of the drive gear. Thus, with this form, it has been necessary to provide a large number of gears to drive the tripping mechanism.

Summary of the invention

It is a principal object of this invention to provide a land measuring device which is simple in construction and overcomes the deficiencies of the prior art.

More particularly, it is an object of the present invention to provide a land measurer having a sprocket or gear which may be driven directly from a worm gear on an implement, the sprocket being provided with removable cams that actuate a trip counter.

It is a further object of the present invention to provide a trip counter having a driven gear with removable cams on one surface that actuates a trip counter, the removable cams being plastic snap buttons.

A further object of the present invention is to provide a land measurer of high reliability and low cost.

These and other objects and advantages of this invention will be apparent to those skilled in the art after a consideration of the following detailed description, taken in conjunction with the accompanying drawings in which the preferred form of this invention is illustrated.

Brief description of the drawings

FIG. 1 is a perspective view of the land measurer of this invention associated with a rotary shaft of an agricultural implement.

FIG. 2 is a perspective view of the land measurer shown in FIG. 1, the view being from the other side of the land measurer.

FIG. 3 is a section along the lines 3—3 in FIG. 2.

Description of the preferred embodiment

The land measurer indicated in the drawings includes a sheet metal support or frame 10 having a pair of outwardly extending apertured L-shaped brackets 12 rigidly secured thereto by screws 14, the apertures within the brackets 12 being in alignment with each other. Each of the brackets is apertured and a sleeve 15 is journaled for rotation within the aligned apertures. The sleeve is disposed about a rotary shaft 16 of an agricultural implement and is secured to the shaft 16 by means of a set screw 18. The shaft 16 is driven from a ground engaging wheel, and the number of times it rotates is proportional to the distance covered by the machine. A worm gear 20 is nonrotatably disposed about the sleeve 14 and is caused to be rotated by rotation of the shaft 16.

A mounting bracket 22 is secured to the frame 10 by means of a screw 24, the mounting bracket having a bifurcated end 26 which may be secured to a portion 28 of the associated agricultural implement by means of a nut and bolt 30 and washer 32. Thus by simply disposing the sleeve 15 about the shaft 16 and securing the bracket 22 to a convenient portion of the implement 28, the land measurer of this invention may be readily mounted.

Carried by the frame 10 and extending outwardly therefrom on the same side as the brackets 12 is a hub 34. Rotatably disposed about the hub is a sprocket 36 whose teeth 38 are in engagement with the worm 20 and cause the gear to be driven as the worm rotates. The sprocket is rigidly secured to a sleeve member (not shown) which is disposed about the hub 34 and which abuts against one side of the frame 10, there being a snap ring 40 which holds the sprocket sleeve assembly on the hub 34.

The sprocket is provided with a plurality of apertures 42 disposed substantially the same distance from its center of rotation, and removable cams, indicated generally at 44, may be disposed therein.

As can best be seen from FIG. 3, each of the removable cams may be in the form of a snap button having a head 46 with an inner surface 48 which is adapted to contact one side 50 of the sprocket 36, and a rounded outer surface 52. Secured to the inner surface 48 of the head 46 are a plurality of legs 54 whose outer ends are spread to secure the button to the sprocket 36. While the removable buttons are preferably made of nylon or a similar plastic, in which case the legs are resiliently disposed in a spread apart position, it should be observed that the buttons could also be made of deformable material, such as metal, in which case it will be necessary to deform the legs 54 to their desired position.

A trip counter 56 is mounted on the frame 10 by screws 58. The counter is provided with a reciprocal lever 60 secured to an input shaft 62 by a set screw 64, the counter being so designed that reciprocation of the lever 60 will cause the counter to trip thereby advancing the register 66.

An arm 68 is provided which may be actuated through the cams 44 and interconnected with the lever 60 by link means 70 to cause the counter to register. The arm 68 is provided with an annular portion 72 rotatably disposed about a shaft 74 having an enlarged end 76. A securing member 78 has an annular portion 80 which rigidly grips the shaft 74, the securing member in turn being secured to the frame 10 by means of conventional fasteners 82. A spring 84 is disposed about the shaft and has one leg 86 which is disposed against the securing member 78 and another leg 88 which biases a curved portion 90 of the arm 68 into engagement with the round outer surface 52 of the removable cams 44.

The land measurer is secured to an agricultural implement by securing, by set screw 18, the sleeve 15 to the shaft 16 of the implement and securing the mounting bracket 22 to a portion 28 of the implement. As the shaft rotates, it causes the worm 20, which is in engagement with the teeth 38 of the sprocket, to rotate the sprocket. Rotation of the sprocket causes, through cams 44, reciprocation of the arm 68, which in turn reciprocates the lever 60 through link 70 to advance the register 66. If the land measurer is designed for machines having widths varying in four foot increments, on a twelve foot machine all but three of the removable cams 44 will be removed from the sprocket 36, in which case the sprocket will cause the register to be only tripped three times for each revolution. If the land measurer is secured to a 32 foot machine, then all eight removable cams will be mounted within the sprocket causing the register to advance eight times during each revolution of the sprocket. For machines of greater width, a multiple pitch drive worm may be substituted for the single pitch worm shown in the drawings.

I claim:

1. A land measurer for use with agricultural implements of the type having a rotary shaft, said land measurer comprising: a frame, drive means secured to said shaft for rotation therewith, a sprocket rotatably mounted on said frame and in driven engagement with said drive means, a plurality of removable cams secured to said sprocket eccentrically to its axis for rotation therewith and extending outwardly from one side thereof, a trip counter mounted on said frame, and means connected to said trip counter and operatively connected with said removable cams as they rotate with said sprocket to intermittently trip said counter in response to rotation of the sprocket.

2. The land measurer set forth in claim 1 in which said means connected to said trip counter with said removable cams includes an arm mounted at one end to said frame and biased into contact with said removable cams, one end portion of said arm being reciprocated during rotation of said sprocket, the trip counter having a reciprocal lever mounted thereon and operable during reciprocation to trip said counter, and link means interconnecting said arm with said reciprocal lever.

3. The land measurer set forth in claim 1 in which said drive means includes a sleeve journaled for rotation on said frame and disposed about said shaft, a worm nonrotatably disposed on the exterior surface of said sleeve, and means to secure said sleeve to said shaft for rotation therewith.

4. The land measurer set forth in claim 1 in which the sprocket is provided with a plurality of apertures disposed at substantially the same distance from the center of rotation of said sprocket, each of said removable cams comprising a snap-in button having head and leg portions, the head portion having an inner surface and a rounded outer surface, the leg portions having a plurality of legs secured at one end to the inner surface of said head and being disposable within one of said apertures, the remote end of said legs being spread to hold the inner surface of said head in close contact with said one side of said sprocket.

5. The land measurer set forth in claim 4 in which said snap-in buttons are formed of resilient plastic material.

6. In combination with an agricultural implement of the type having a rotary shaft in which the total number of the revolutions of the rotary shaft is proportional to distance in which the implement is propelled, a land measurer comprising: a frame, a worm gear rotatably carried by said frame and disposable about said shaft, means to rigidly secure said worm gear nonrotatably about said shaft, a sprocket rotatably mounted on said frame and in driven engagement with said worm gear, a plurality of removable trip buttons secured to said sprocket and extending outwardly from one side thereof, a trip counter mounted on said frame, said trip counter having a reciprocal lever mounted thereon and operable during reciprocation to trip said counter, and means interconnecting said lever arm with said removable trip buttons and operable during rotation of said sprocket to reciprocate said lever, the parts being so arranged and constructed that the trip counter may be secured to implements of varying width, trip buttons being removed when the width is less than the maximum for which the land measurer is designed whereby accurate measurements may be obtained in machines of varying widths.

7. The land measurer set forth in claim 6 in which the means interconnecting the lever arm with the removable trip buttons comprises an arm mounted at one end to said frame and biased into contact with said trip buttons, one end portion of said arm being reciprocated during rotation of said sprocket, and link means interconnecting said one end of said arm with said lever.

8. The land measurer set forth in claim 7 in which the sprocket is provided with angularly spaced apertures and in which each of the removable trip buttons comprises a snap-in button disposable within an aperture extending through said sprocket, each snap-in button having head and leg portions, the head portion having an inner surface and a rounded outer surface, the leg portions having a plurality of legs secured at one end to the inner surface of said head and being disposable within an aperture on the sprocket, the remote end of said legs being spread to hold the inner surface of said head in contact with one side of said sprocket.

References Cited

UNITED STATES PATENTS

| | | | |
|---|---|---|---|
| 1,052,054 | 2/1913 | Hendren | 33—141.5 |
| 1,663,598 | 3/1928 | Holmquist | 33—141 |
| 2,123,360 | 7/1938 | Harris | 33—141 |
| 2,741,031 | 4/1956 | Martin et al. | 33—141 |
| 3,137,073 | 6/1964 | Rawlinson | 235—95 |

RICHARD B. WILKINSON, *Primary Examiner.*

STANLEY A. WAL, *Assistant Examiner.*

U.S. Cl. X.R.

33—141